Oct. 17, 1961 P. MAUBORGNE 3,004,731
REEL FOR FISHING RODS

Filed Nov. 26, 1956 4 Sheets-Sheet 1

INVENTOR
P. MAUBORGNE
BY
ATTORNEYS

Oct. 17, 1961 P. MAUBORGNE 3,004,731
REEL FOR FISHING RODS
Filed Nov. 26, 1956 4 Sheets-Sheet 2

Inventor
P. Mauborgne
By Glascock Downing Seebold
Attys.

Oct. 17, 1961 P. MAUBORGNE 3,004,731
REEL FOR FISHING RODS
Filed Nov. 26, 1956 4 Sheets-Sheet 3

Inventor
P. Mauborgne
By Glaser Downing Seebold
Attys

Oct. 17, 1961 P. MAUBORGNE 3,004,731
REEL FOR FISHING RODS
Filed Nov. 26, 1956 4 Sheets-Sheet 4

Inventor
P. Mauborgne
By Glascot Downing Seebold
Attys.

3,004,731
REEL FOR FISHING RODS
Paul Mauborgne, Bernouville (Eure), France
Filed Nov. 26, 1956, Ser. No. 624,321
Claims priority, application France Dec. 1, 1955
5 Claims. (Cl. 242—84.2)

The invention is in respect to reels of the fixed drum type and more specifically to reels wherein, during casting, the reel having an axis parallel to the fishing rod is stationary while the line freely unreels.

It is well known that this method of unreeling has the drawback of twisting the line once around itself for each turn which is reeled off.

This drawback can be compensated during reeling in, if the line is reeled in such a manner as to produce a twist in the opposite direction, this usually being achieved by reeling in with the aid of an attachment known as a pick-up which causes the winding-in to be effected by a relative rotation of the spool and the pick-up, the axis of the spool remaining parallel to the direction of the fishing rod.

However, the friction of the line on the pick-up entails various drawbacks, notably fatigue and wear of the line.

The present invention has as its object to dispense with the pick-up by employing a method of reeling-in which gives the line an amount of twist equal to and in the opposite direction of that which it sustains during reeling-out.

The reel of the type known as the fixed drum variety to which the invention relates, belongs to the kind—quite well known in itself—in which the spool is mounted in such a fashion that its axis—which is parallel to the fishing rod during reeling-out, as in fixed drum reels—can be brought perpendicular to the fishing rod during reeling-in, as is the case with the so-called rotary bobbin reels.

No practical development has been made towards designing fixed-drum reels specifically in the manner referred to precisely because the line is reeled-in without being untwisted.

The object of the present invention is to provide this kind of perfection, by virtue of which the line is untwisted during the reeling-in operation without any pick-up being used.

According to the invention, the spool is mounted on a support in such a manner that, during reeling-in, the spool is subjected not only to the usual rotational movement about its own axis—the motion which effects the actual reeling-in—but also to a rotary movement around an axis parallel to the direction of the fishing rod, the direction of this rotary movement being selected such as will effect untwisting, that is to say, a twisting action of a direction opposite to that which the line sustained during reeling-out.

The description which follows refers to examples of how the idea underlying the invention can be put into effect, it being understood that there is no implication on the part of the applicant to limit the generic scope of his invention to matters of detail or to particularities specific to the example chosen for the purpose of illustration.

The invention will be further described with reference to the accompanying drawings, in which.

Figure 1:
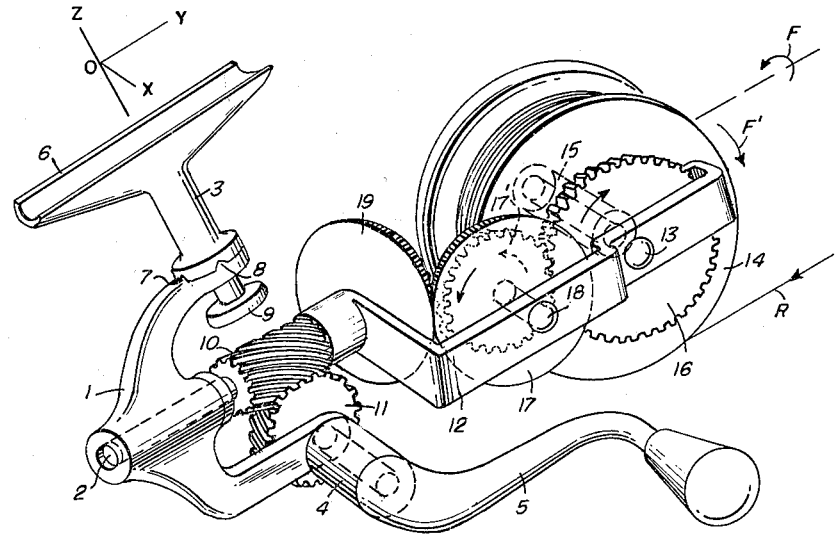
FIG. 1 represents a reel according to the invention, in the reeling-in position.
Figure 2:
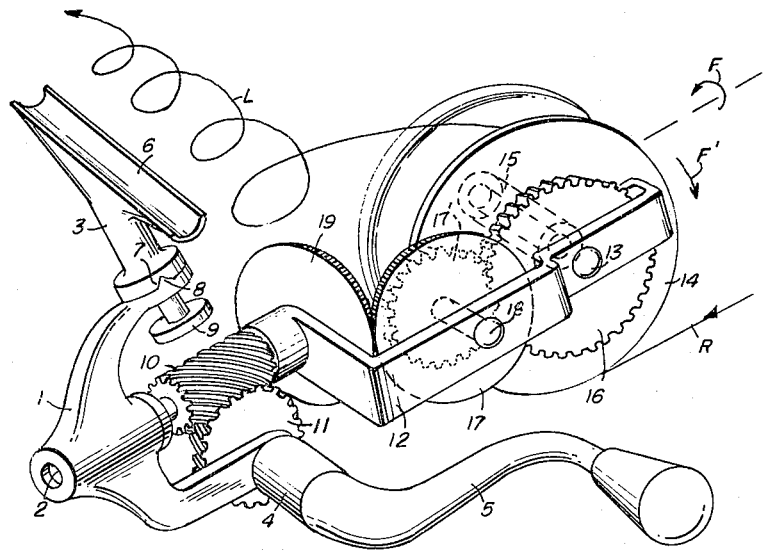
FIGURE 2 represents the same reel in the reeling-out position.

For the sake of illustration the reel is shown in FIGURE 2 as being in the same position as in FIGURE 1, the support having been turned around by 90°, although it is necessary to appreciate the fact that, in actual practice, it is the reverse which takes place, namely, the reel effects a 90° turn in regard to the support.

In these drawings, 1 refers to the general mounting of the reel which is provided such as to accommodate and support on the one hand, shaft 2 which is fixed in relation to the mounting, on the other hand the foot, that is to say attachment 3 for fixing the reel to the fishing rod, and, finally, shaft 4 of handle 5, this shaft 4 being supported by mounting 1 in such a fashion as to be capable of rotation.

The fixing attachment is constituted by a shank to which reference number 3 applies more particularly; this shank carries an ordinary type of cradle 6 in which the fishing rod is lodged in the usual manner, this being fitted to the cradle by any usual means. Shank 3 is pivotally mounted on mounting 1 in such a fashion as to be able to rotate about its geometrical axis OZ.

The geometrical axes of shank 3, shaft 2 and shaft 4 are arranged according to three directions parallel to those of an orthogonal trihedron OXYZ.

On the other hand, it is of advantage to make provision for a means of determining and fixing the directional bearing of shank 3 in relation to mounting 1. The method chosen for the purpose of illustration, is the well-known method for determining and fixing constituted by two catches 7 and 8 provided in the mounting and arranged at 90° to each other in a perpendicular plane to geometrical axis OZ of the shank, and two notches corresponding to the catches, provided in shank 3. In addition there is a spring fitted in the lower portion 9 of shank 3 to ensure engagement of the catches in their notches. This spring is not illustrated in the drawings, but it is stated that the device for determining the position and fixing is a well known one and does not form part of the invention, and can be replaced by any other, equivalent means.

It is also possible, for instance, to dispense with the notches, in which case the member shown as 9 will be the head of a locking screw which, in the customary manner, locks the two members 3 and 1 together to one integral unit. In this event the angler will determine the relative positions of the shank and the mounting by trial and error.

Whatever course is adopted, it is necessary and sufficient, when putting the invention into practice, for the shank to be capable of assuming two positions, at 90° or thereabouts to each other and for which, axis 2, in one of the two positions, will be parallel to OY, that is to say, parallel to the plane determined by the geometrical axes of the shank and the fishing rod and in the other position parallel to OX, that is to say, perpendicular to the said plane.

On shaft 2 helically threaded sleeve or worm 10, fitted so as to be able to turn freely, engages with helical pinion 11 which is solidly locked with shaft 4 of the handle when the same rotates. An arm 12 is solidly locked, rotationally, with helical sleeve 10, or may in fact form one integral unit with same but the precise details of the arm form no part of the invention. This arm 12 carries a spindle 13 fitted perpendicularly to same and on which spool 14 rotates by means of a drum 15 on to which the spool is fitted in the normal manner such that it is detachable and would, generally, be a friction fit, by means of the usual means (not shown).

A pinion 16 is locked in rotation with the drum and engages with pinion 17' integral with bevel gear 17 mounted on shaft 18 carried by arm 12. Bevel gear 17 meshes with bevel gear 19 on shaft 2.

The manner of operation is as follows:

In the position shown in FIGURE 1, which is the reeling-in position, it is seen that a rotation of the handle causes sleeve 10 to rotate and, consequently, results in the rotation of the spool about the geometrical axis of shaft 2, and spindle 13 on which the spool is mounted turning in a plane perpendicular to this geometrical axis.

Simultaneously with this, the movement of arm 12 causes bevel gear 17 to rotate around bevel gear 19 and, as a result of the meshing between the same, brings about a rotation of pinions 17' and 16 and therefore, a rotation of the spool around itself.

To each turn of the spool about itself, there is a corresponding turn of the spool in relation to the geometrical axis of shaft 2.

It is obvious therefore, that the line shown in FIGURE 1 as R, winds on to the spool which is presumed to turn about its own axis in the direction of arrow F' and about the geometrical axis of shaft 2 in the direction denoted by arrow F, this latter rotary movement providing the untwisting action.

It will be noted that this double rotation, by selecting the angle at which reeling-in is effected, makes possible a uniform distribution of the line over the whole length of the drum, a result all the more worthy of note in so far as it is achieved, using a pick-up, with the aid of a mechanism providing oscillatory movement, to achieve which is always a complicated and costly matter. In connection with this it will be obvious that the spindle carrying the spool will not make an angle of exactly 90° with the fishing rod during the reeling-in process.

In FIGURE 2, L denotes the line unreeling freely and giving rise to the inevitable twisting action which this manner of unreeling involves.

It can clearly be seen that the respective twists take place in opposite directions in the two figures.

It is pointed out that:

The geometrical axis of shank 3 does not necessarily have to encounter the geometrical axis of shaft 2 and of shaft 4.

The manner of transmission selected to effect the two rotations is certainly one of the most simple and most convenient to be put into practical application, though it can be replaced by any other, equivalent, method of transmission, whether the transmission of the two movements be combined, as in the example, or whether they remain distinct from each other.

Another method of putting the invention into effect, and which will be understood by reference to FIGURE 1, consists in allowing for the possibility of detaching shaft 2 and re-inserting it in a corresponding seating provided in the shaft of the handle at the end of this shaft opposite to the said handle. If put into effect along these lines, shaft 2 could be given a square shape at its end and a locking arrangement could be provided to prevent any rotation, during the time the line is being cast, of the rotary members mounted on shaft 2.

With such a simplified design it is seen that the reel assembly no longer requires the provision of means enabling it to rotate and assume various positions around axis OZ.

Figure 3:
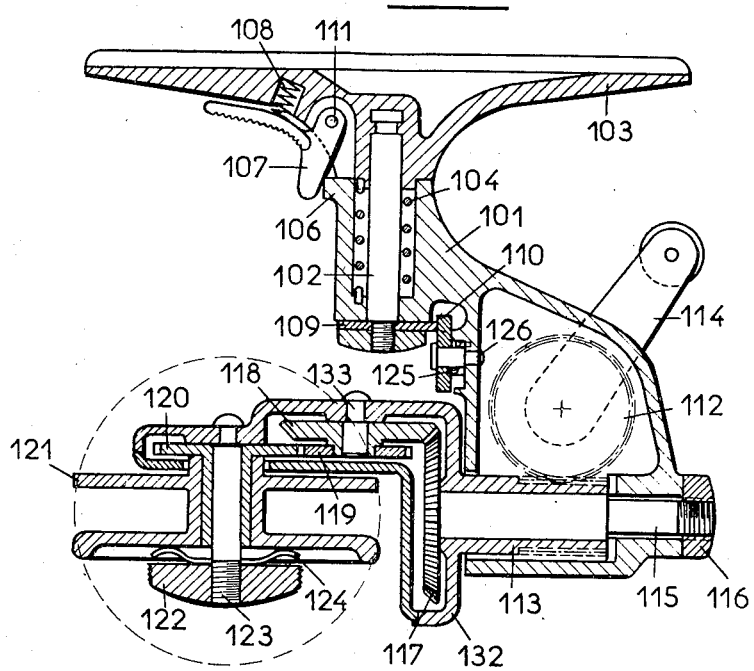
FIGURE 3 is a cross-section of an alternative design, in the reeling-in position.
Figure 4:
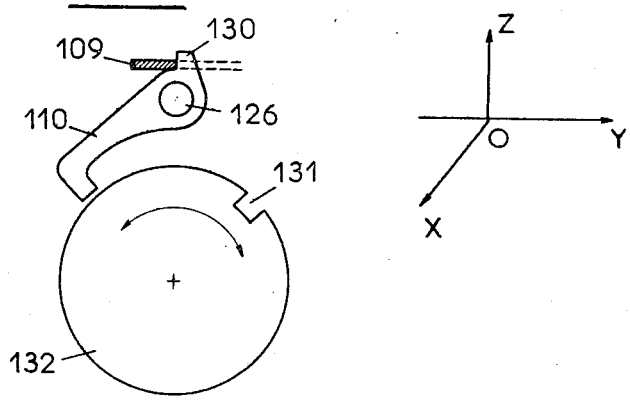
FIGURE 4 is a detail of FIGURE 3.
Figure 5:
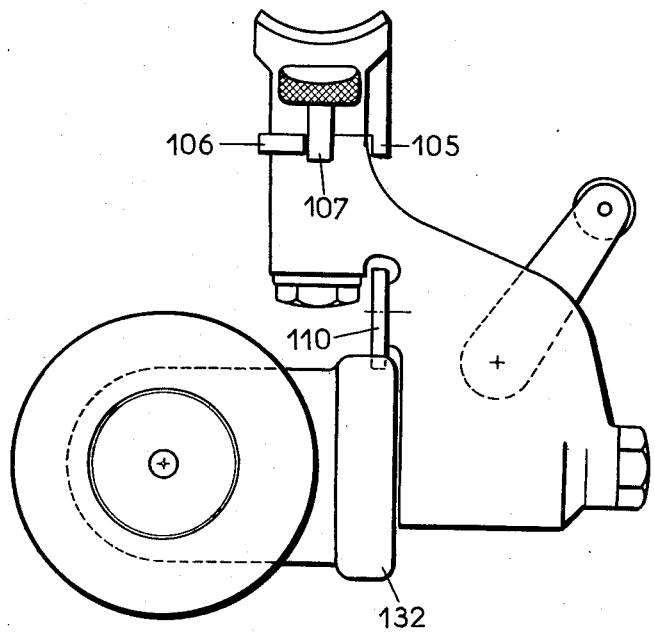
FIGURE 5 is a reel in FIGURE 3 seen in elevation and in the reeling-out position.

According to another method of putting the invention into effect, represented in FIGURES 3, 4 and 5, the changeover from the reeling-in position (FIG. 3) to the reeling-out position (FIG. 5) is effected by the composition of two rotations, one around axis OZ, the other around perpendicular axis OY, both in the plane of FIGURE 3. The spool's axis of rotation which is in the plane of FIGURE 3, is perpendicular to the plane of FIGURE 5.

In this constructional design, the portion of the support designated by 101, is able to turn around spindle 102 which is stationary in relation to mounting 103. Two stop positions at 90° to each other, are provided with the aid of fixed stop 105 which forms an integral part of mounting 103, and buffer 106 which forms an integral part of support 101. The spring 104 fitted in a recess around spindle 102 tends at all times to make support 101 turn in the trigonometrical direction, that is to say, to lead stop 106 around until it bears against stop 105. Bolt 107, pivoting around pin 111 which is integral with mounting 103, is subjected to the action of spring 108 and is so arranged as to be capable of arresting stop 106 in a position at 90° in relation to stop 105.

Cam 109 which is integral with spindle 102, is fitted so as to act on the lifting heel 130 of bolt 110, which, acted upon by spring 125, is able to pivot around spindle 126 which is integral with support 101. Spring 125 tends to make the bolt engage in notch 131 to which further reference will be made later.

Handle 114 turns inside support 101 and causes pinion 112 to rotate; this engages with endless screw or worm 113. Worm 113 rotates around shaft 115 which is fixed on support 101 and held stationary by nut 116. Worm 113 is integrally locked on rotary support 132, on the outer face of which notch 131, mentioned above, is provided. Pinion 117, keyed on shaft 115, engages with pinion 118 which turns around a spindle 133 which is integral with support 132. Pinion 119 which is integral with pinion 118, engages with pinion 120 on whose spindle 123 the spool (121) can be mounted. Spindle 123 is integral with support 132. Nut 122, screwed on the threaded end of spindle 123, compresses spring 124 as required, to provide the usual brake action on the spool, though the manner in which this is effected is outside the scope of the present invention.

The manner of operation is as follows:

In the reeling-in position represented in FIGURE 3, handle 114, by the intermediary of worm wheel 112 and worm 113, causes support 132 to rotate around shaft 115. Since the transmission ratio of pinions 117, 118, 119 and 120 is selected such as to equal unit value, it is seen that one complete rotation of support 132 around shaft 115 entails one complete rotation of spool 121 around spindle 123.

In the reeling-in position which has just been described, stop 106 is in contact with stop 105.

In order to change over to the casting position represented in FIGURE 5, the angler turns support 101 about spindle 102 until bolt 107 drops behind stop 106 under the action of spring 108.

Cam 109 which in the previous position was acting on heel 130 of bolt 110, ceases to bear on this heel. The angler can make support 132 turn until bolt 110 is able to engage, under the action of spring 125, in notch 131 of support 132, thereby holding this support stationary in the position represented in FIGURE 5.

In order to return to the position shown in FIGURE 3, the angler manipulates bolt 107 so as to disengage stop 106 thereby allowing support 101 to pivot 90° under the action of spring 104.

In this rotary movement, heel 130 collides against cam 109 causing support 132 to be released by the fact that bolt 110 is made to leave notch 131.

Figure 6:
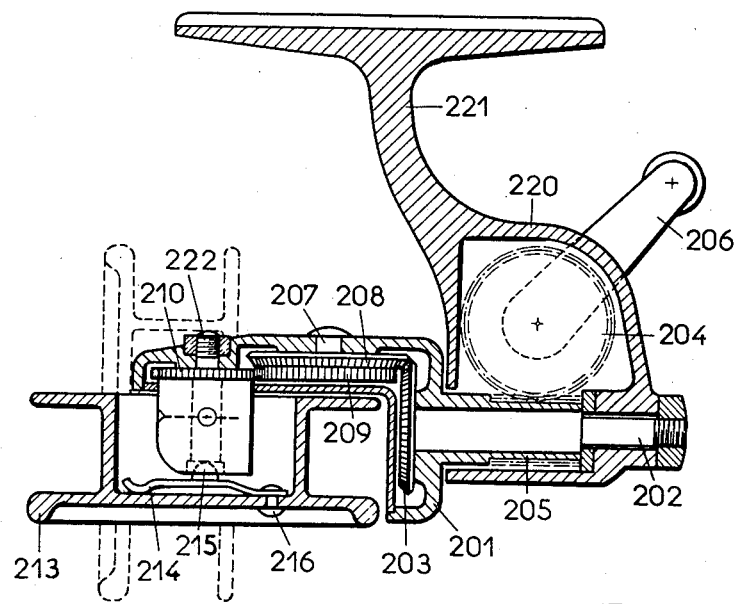
FIGURE 6 is a view similar to FIGURE 3 of a further alternative design.
Figure 7:
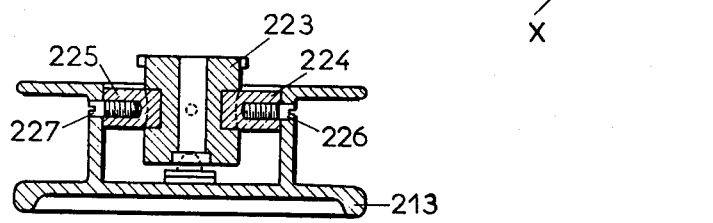
FIGURE 7 is a detail of FIGURE 6.

In the method represented in FIGURES 6 and 7 there is no longer any rotation about axis OZ but a rotation around axis OY during reeling-in and a pivoting about an axis parallel to OX for changing over to the casting position.

In this form, casing 220 is fixed in relation to mounting 221. Handle 206 which turns inside casing 220, controls—by means of pinion 204—the rotation of screw 205 which rotates around shaft 202 which, as previously, is solid with casing 220. Endless screw 205 is integral with rotary support 201. Pinion 203 is keyed on shaft 202 and engages with pinion 208 turning around spindle 207 which is solid with support 201. Pinion 209, which is locked solid with pinion 208, engages with pinion 210 which rotates around spindle 222 which is integral with support 201 and on which is keyed hub 223 which has two journals 224 and 225 into which penetrate respectively pivot screws 226 and 227 which traverse the cylindrical portion of spool 213. Thus, this spool is able to pivot about the axes of journals 224 and 225 and take up the position represented in unbroken lines in FIGURE 6 (reeling in position) or the position represented in broken lines (casting position). A spring 214 fixed on the reel by rivet 216, presses finder pin 215 so as to engage it in the appropriate notches provided in hub 223 which correspond respectively to the two positions which the spool is able to assume. Thus, the angler is able to swivel the spool at will into one or the other of the two positions.

In the reeling-in position, the transmission of the movement of handle 206 to the spool 213 is the same as that which has been described in the previous example.

What I claim is:

1. In a fishing reel adapted to be mounted on a fishing rod, including a spool, in combination, a primary support, means carried by said primary support for mounting said spool for rotation about its axes, a second support in which the primary support is mounted for rotation about the axis of said primary support, means for selectively mounting the spool with its axis parallel to the fishing rod while casting or at right angles thereto in the reeling-in position, drive means, and gear means operatively connected with said primary support, said spool and said drive means to rotate the spool about its axis and simultaneously to rotate the primary support about its axis.

2. A fishing reel including a spool, a primary support, a shaft for said spool rotatably mounted in the primary support, a second support pivotally mounted to assume predetermined positions around an axis perpendicular to the axis of the fishing rod, means rotatably mounting the primary support on the second support, handle means rotatably mounted in said second support, and means for transforming the rotary movement of the handle means into rotary movement of the primary support in relation to said second support and simultaneously to rotate said spool on said shaft.

3. A fishing reel as claimed in claim 1, in which said means for selectively mounting the spool includes means detachably mounting said primary support on the second support.

4. A fishing reel as claimed in claim 1, further including a third support in which said second support is pivotally mounted, said primary support being adapted to assume predetermined positions in relation to the second support and means for maintaining said primary support in said predetermined positions.

5. A fishing reel as claimed in claim 1, in which said means for selectively mounting the spool includes a third support mounted on said primary support about which said spool is pivotally mounted.

References Cited in the file of this patent

UNITED STATES PATENTS

| | | |
|---|---|---|
| 303,347 | Wakeman | Aug. 12, 1884 |
| 2,183,618 | Magruder | Dec. 19, 1939 |
| 2,199,651 | Quick | May 7, 1940 |
| 2,559,215 | Funk | July 3, 1951 |
| 2,589,776 | Colgrove | Mar. 18, 1952 |